US008668589B2

(12) United States Patent
Hafezi

(10) Patent No.: US 8,668,589 B2
(45) Date of Patent: Mar. 11, 2014

(54) NETWORKING GAMING SYSTEM AND METHOD INCLUDING A PLURALITY ELECTRONIC GAMING DEVICES THAT INDICATE AVAILABLE SEATS AT DIFFERENT TIMES

(76) Inventor: Jonathan Khashayar Hafezi, Charlotte, NC (US)

( * ) Notice: Subject to any disclaimer, the term of this patent is extended or adjusted under 35 U.S.C. 154(b) by 0 days.

(21) Appl. No.: 13/420,350

(22) Filed: Mar. 14, 2012

(65) Prior Publication Data

US 2013/0244787 A1 Sep. 19, 2013

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................... 463/42; 463/13; 463/16; 463/29

(58) Field of Classification Search

USPC .................. 463/16–20, 25, 29, 40–42, 11–13

See application file for complete search history.

(56) References Cited

U.S. PATENT DOCUMENTS

| | | | | |
|---|---|---|---|---|
| 6,923,724 | B2 * | 8/2005 | Williams | 463/42 |
| 7,510,474 | B2 * | 3/2009 | Carter, Sr. | 463/29 |
| 8,308,568 | B2 * | 11/2012 | Amaitis et al. | 463/42 |
| 8,323,102 | B2 * | 12/2012 | Lutnick et al. | 463/29 |
| 2003/0006931 | A1 * | 1/2003 | Mages | 342/357.06 |
| 2006/0035707 | A1 * | 2/2006 | Nguyen et al. | 463/29 |
| 2007/0265050 | A1 * | 11/2007 | Baazov | 463/13 |
| 2008/0311994 | A1 * | 12/2008 | Amaitis et al. | 463/39 |
| 2009/0191955 | A1 * | 7/2009 | Seelig et al. | 463/25 |
| 2009/0197684 | A1 * | 8/2009 | Arezina et al. | 463/42 |
| 2011/0105208 | A1 * | 5/2011 | Bickley | 463/13 |

* cited by examiner

*Primary Examiner* — Milap Shah

(74) *Attorney, Agent, or Firm* — Thibault Patent Group

(57) ABSTRACT

A system for providing live-play, network-based gaming to players is described, the system comprising providing a server that provides a game to a first player operating a first electronic gaming device located at a first authorized gaming establishment and a second player operating a second electronic gaming device located at a second authorized gaming establishment, the game comprising a live game of chance and/or skill played between the first and second players or between the players and a house entity, and connecting the server to a communication medium for electronically coupling the server to the first electronic gaming device, the second electronic gaming device, and to other electronic gaming devices that are located within the first and second authorized gaming establishments.

10 Claims, 9 Drawing Sheets

NETWORKING GAMING SYSTEM AND METHOD INCLUDING A PLURALITY ELECTRONIC GAMING DEVICES THAT INDICATE AVAILABLE SEATS AT DIFFERENT TIMES

BACKGROUND

I. Field of Use

The present application relates generally to gaming devices and systems, and more specifically to gaming devices interconnected by a network.

II. Description of the Related Art

A variety of Internet-based games of chance and/or skill has gained widespread popularity over the past several years. Such games include a wide variety of poker games, such as Texas Hold-'em, draw poker, stud poker, etc., as well as non-poker type games such as Keno, Bingo, Roulette, Craps, as well as other games. Players of such games typically access a central server via a personal computer connected to the Internet. Each player typically sets up an account with a preferred gaming website and funds the account with money using a variety of methods, such as wire transfer or credit card. After establishing an account, a player may select a game that they wish to play from a variety of games typically offered by the gaming website. Players may be given a choice of where to "sit" at a particular virtual game table and are generally able to receive electronic representations of playing cards, reels, dice, Bingo balls, keno numbers, etc. in accordance with the selected game. As game play progresses, players may place one or more wagers in accordance with the game based on funds available in their account balance.

While the above-described scenario provides a convenient and comfortable way for players to participate in games of chance and/or skill, there are several drawbacks. In the United States, for example, Internet-based wagering is generally considered illegal and, as a result, players that participate in such Internet-based gaming risk fines and/or jail time if discovered. Website owners/operators offering Internet-based gaming must be located outside the United States to avoid prosecution. In addition, there is no way to enforce minimum requirements for game players, such as a minimum age requirement (typically age 21 in the United States for casino gambling).

Casino-based gaming has been popular for decades. Gaming gained a foothold in the United States in Las Vegas in the early 1930's, and has spread more recently to cities such as Atlantic City, N.J. and Detroit, Mich. Gaming has gained widespread acceptance and may be found in virtually every state in the United States in the form of riverboats, Indian Casinos, card rooms, bingo halls, lotteries, and racetracks. Often, these authorized gaming establishments offer card rooms that allow patrons to play a variety of card games against each other (such as in poker) or against a common entity, such as "the house" or "the dealer" (such as in Blackjack). They may also offer other games of chance and/or skill that are played at the authorized gaming establishment, such as roulette, craps, blackjack, keno, bingo, and so on, where patrons interact with games located on the premises.

There are several problems associated with casino-based gaming. First and foremost, while casinos and gaming venues have become dramatically more prevalent, individuals must still physically travel to these establishments to participate in gaming activities. Often, this factor alone discourages potential gamers from participating in games of chance and/or skill This factor also inhibits spontaneity, causing potential gamers from refraining from participation. Another disadvantage of casino-based gaming, especially "live" poker found in card rooms, is that players may feel intimated by other, more seasoned players and, thus, avoid such live play.

It would be desirable to offer gaming to individuals that avoids the problems of Internet-based gaming and the problems of casino-based gaming.

SUMMARY

The embodiments described herein relate to networked gaming systems and methods. In one embodiment, a live-play, networked gaming system comprises a memory for storing processor-executable instructions, a processor for executing the processor-executable instructions that, when executed by the processor, cause the apparatus to: provide a game to a first player of a first electronic gaming device located at a first authorized gaming establishment and to a second player of a second electronic gaming device located at a second gaming establishment, the game comprising a live game of chance and/or skill played between the first and second players or between the players and a house entity, and a network interface for electronically coupling the apparatus to the first electronic gaming device, the second electronic gaming device, and to other electronic gaming devices that are located within the first or second authorized gaming establishments In another embodiment, a method for providing network-based gaming to a plurality of electronic gaming devices is described, comprising providing a server that provides a game to a first player operating a first electronic gaming device located at a first authorized gaming establishment and a second player operating a second electronic gaming device located at a second authorized gaming establishment, the game comprising a live game of chance and/or skill played between the first and second players or between the players and a house entity, and connecting the server to a communication medium for electronically coupling the server to the first electronic gaming device, the second electronic gaming device, and to other electronic gaming devices that are located within the first and second authorized gaming establishments.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
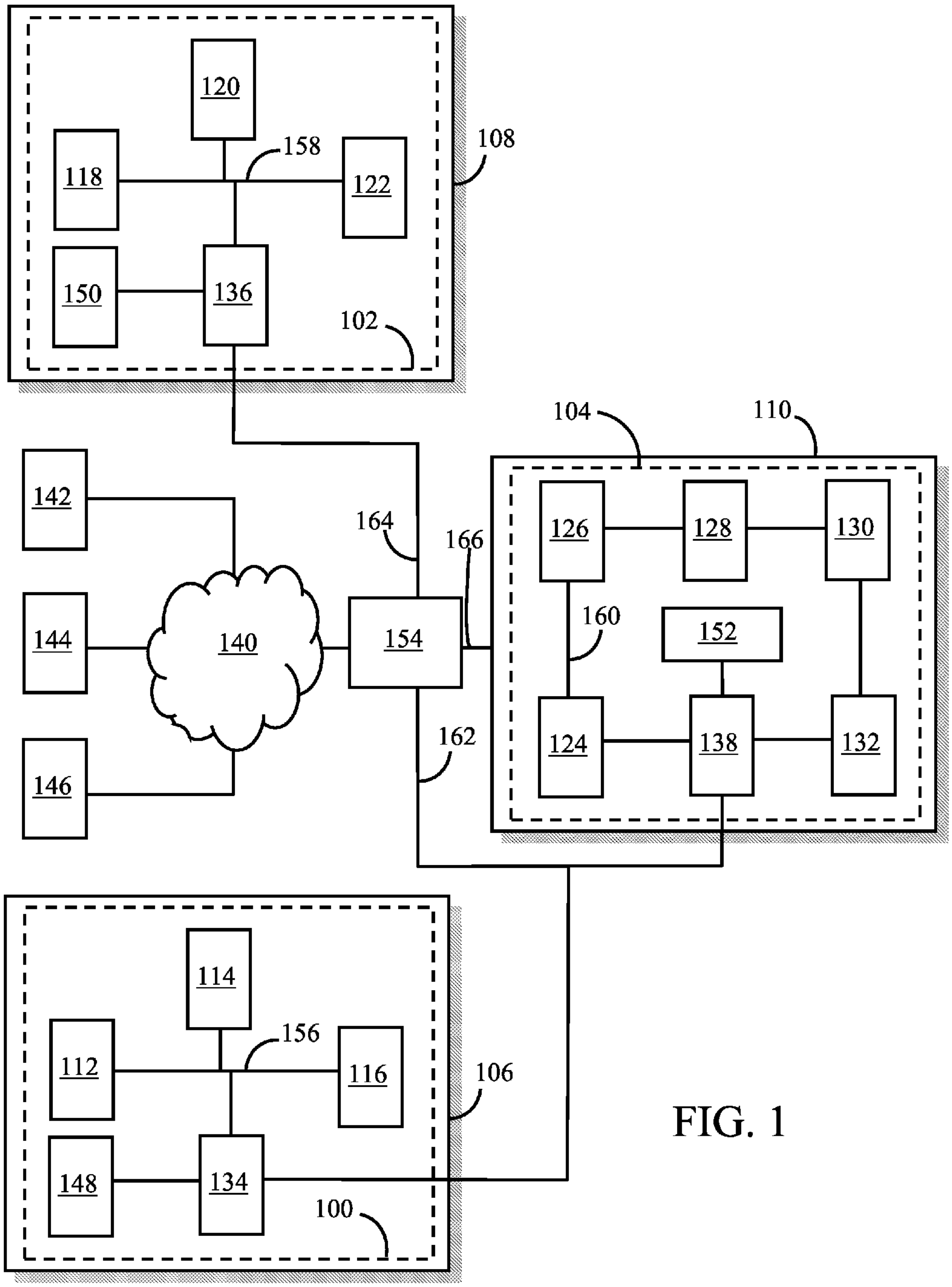
FIG. 1 illustrates a networked gaming system in accordance with the teachings herein, used by single or multiple authorized gaming establishments.

The present description relates to networked gaming systems and methods. Such network gaming systems may be used by one or more authorized gaming establishments to provide "live" game play to individuals via electronic gaming devices located on each authorized gaming establishment's property. "Live" game play may refer to an ability for an individual to play games such as poker, blackjack, craps, roulette, Pai-gow, keno, lotto, bingo, in real-time or near real-time with and/or against other human beings and/or a house entity located, in one embodiment, within the same authorized gaming establishment, or, in another embodiment, located at another authorized gaming establishment, or, in yet another embodiment, remotely located from any authorized gaming establishment, such as an individual participant in game play using a home computer via the Internet, or, in still another embodiment, any combination of the foregoing.

One of the advantages of provided a networked gaming system where electronic gaming devices are located on the premises of authorized gaming establishments is that gaming can be regulated in accordance with local, state, and federal laws. For example, many jurisdictions require a minimum age to participate in gaming, typically 21 years of age. By locating electronic gaming devices inside authorized gaming establishments, a higher degree of compliance with such laws may be achieved. In addition, the chances of cheating or tampering with electronic gaming devices are greatly reduced by locating electronic gaming devices within the confines of an authorized gaming establishment. Such establishments typically must meet a host of requirements before becoming authorized to provide gaming to individuals, not the least of which is providing a minimum level of security to ensure that cheating and tampering with electronic gaming devices do not occur.

Another advantage of providing a networked gaming system inside established authorized gaming establishments is that it may attract individuals who would normally be reluctant to participate in live, head-to-head game play against others. For example, many individuals are intimidated to play live poker against other players inside a card room, due to the confrontational nature of such game play. By provided electronic gaming devices to such individuals, they may engage in "live" poker games without having to directly confront other players visually or verbally.

As used herein, the term "electronic gaming device" refers to an electronic or electro-mechanical device that allows a player to play one or more games, either against other players, against "the house", e.g., authorized gaming establishment, or a combination of both. Such electronic gaming devices allow an individual to play games such as poker (in any number of its forms), roulette, craps, bingo, keno, slots, blackjack, and other games of chance and/or skill in real time or near real-time against other, real individuals and/or a house entity. In one embodiment, electronic gaming devices are manufactured in accordance with a set of standards set by the Regulations of the Nevada Gaming Commission in, for example, "Technical Standards for Gaming Devices and On-Line Slot Systems".

The term "live-play" refers to real time or near real-time game play among/between human beings, each operating a respective electronic gaming device.

The term "authorized gaming establishment" refers to herein as any place of business that has been authorized by any local, state, federal, or other governmental body, to provide gaming services to individuals. Such establishments may include traditional casinos, Indian casinos, bingo parlors, card rooms, racetracks, riverboats, bars, airports, restaurants, and virtually any other establishment that is authorized to provide gaming to its customers.

FIG. 1 illustrates networked gaming systems 100, 102, and 104, each located on the premises of authorized gaming establishments 106, 108, and 110, respectively. In one embodiment, these gaming system operate independently from one another. In another embodiment, these gaming systems are inter-related to each other via server 154, as explained in greater details below. It should be understood that in other embodiments, a greater or fewer number of authorized gaming establishments could be used, more than one networked gaming system could be located within a single authorized gaming establishment, and other variations regarding the number and placement of networked gaming systems and/or authorized gaming establishments.

Each authorized gaming system shown in FIG. 1 comprises one or more electronic gaming devices. Shown in FIG. 1 are electronic gaming devices 112, 114, and 116 located on the premises of authorized gaming establishment 106, electronic gaming devices 118, 120, and 122 located on the premises of authorized gaming establishment 108, and electronic gaming devices 124, 126, 128, 130, and 132 located on the premises of authorized gaming establishment 110. Each of the electronic gaming devices allows an individual to participate in one or more games of chance and/or skill, either against other individuals using any of the other electronic gaming devices, against "the house", e.g., authorized gaming establishment, or a combination of both. Such electronic gaming devices allow an individual to play games such as poker (in any number of its forms), roulette, craps, bingo, keno, slots, blackjack, and other games of chance and/or skill Although FIG. 1 illustrates a particular number of electronic gaming devices associated with each networked gaming system, it should be understood that in other embodiments, a greater or fewer number of electronic gaming devices may be used in association with each networked gaming system.

Each networked gaming system 106, 108, and 110 additionally comprises a server 134, 136, and 138, respectively, that are networked to their respective electronic gaming devices via communication medium 156, 158, and 160, respectively. The communication medium may comprise air (in the case of wireless networking), electrical or fiber optic cable, or any other well-known way to allow communications between/among servers and their respective electronic gaming devices. Each of the networked gaming system may use the same, or different, communication medium than other networked gaming systems. The servers communicate with their respective electronic gaming devices over their respective communication mediums, typically using well-known digital communication protocols such as TCP/IP, RS-485 protocols, RS-422 protocols, fiber optic protocols, USB protocols, or other digital communication protocols well known in the art.

Each server performs a variety of tasks necessary for game play between and among individuals at different electronic gaming devices. Although each of the servers 134, 136, and 138 are shown co-located with their respective electronic gaming devices, they could be located at a different location than their respective gaming devices, for example, in another jurisdiction, connected to their respective electronic gaming devices via the Internet.

Each networked gaming system 100, 102, and/or 104 may additionally comprise a slot club card server, the slot club card server for tracking player playing characteristics, such as the amount of time a player plays a particular game, a total amount that a player has wagered in a given time fame, an average number of wagers, an average wager size, a number of times that a player has "gone all in", and other characteristics. Such slot club card servers are well known in the art and are shown in FIG. 1 as slot club card servers 148, 150, and 152.

Players typically register with the slot club card server in each authorized gaming establishment that they wish to play in. In return, they are typically given a "player's card" in return. The player's card may then be inserted by the player into a selected electronic gaming device prior to game play. The slot club card server receives an indication that the player has begun operating the electronic gaming device, and the slot club card server may then be provided information pertaining to time played, wagers placed, etc. This information is stored in an electronic memory inside the slot club card server and may be analyzed by the authorized gaming establishment for marketing purposes, for general business purposes, for offering players rewards or "comps", or other purposes.

Often, an award is given to players whose characteristics meet a predetermined minimum criterion. For example, players who play 10 hours of total game play at any one of the electronic gaming devices within authorized gaming establishment 106 may receive a free buffet dinner or overnight stay in a hotel room.

In one embodiment, a player of an electronic gaming device playing a game against other players at different electronic gaming devices may be given an award if the player places a predetermined number of "all-in" bets. An all-in bet is when a player places a bet during a round of game play where all of the player's available "chips" are wagered at one time. This type of bet is most commonly used in poker. If any player places a predetermined number of all-in bets within a predetermined time frame, such as 30 all-in bets in a day, then those players may receive a free dinner, room, or other award.

Of course, other types of criteria could be tracked to award goods and services to players. For example, an award could be given to players who win a predetermined number of jackpots or tournaments. These results may be tracked by the slot club card server to determine when a predetermined number of victories have been achieved. An award could be given to players who lose a certain number of hands, or lose a predetermined number of hands in a row as a consolation prize.

As mentioned above, in one embodiment, each networked gaming system typically operates independently from one another. For example, individuals playing games on electronic gaming devices 112, 114, and/or 116 may only play against each other and not against individuals playing games on electronic gaming devices located at authorized gaming establishments 108 and 110.

In another embodiment, individuals from one authorized gaming establishment may play games against individuals in other authorized gaming establishments via server 154 and communication channels 162, 164, and 166. Server 154 performs a variety of tasks necessary for game play between and among individuals at different electronic gaming devices located at different authorized gaming establishments. For example, server 154 may allow an individual to play live Texas Hold 'Em poker at electronic gaming device 116 against individuals at electronic gaming devices 118, 122, 124, and 132, respectively.

In yet another embodiment, individuals from one authorized gaming establishment may play games against individuals located remotely from any authorized gaming establishment, via server 154 connected to a wide area network, shown in FIG. 1 as Internet 140. In this embodiment, an individual may use a personal computing device 142, 144, and/or 146 (e.g., a home computer, tablet device, smartphone, etc.) connected to Internet 140 to play games of chance and/or skill with individuals located at electronic gaming devices inside authorized gaming establishment 106, 108, and/or 110. Server 154 performs a variety of tasks necessary for game play between and among individuals at different the various electronic gaming devices and personal computing devices.

Figure 2:
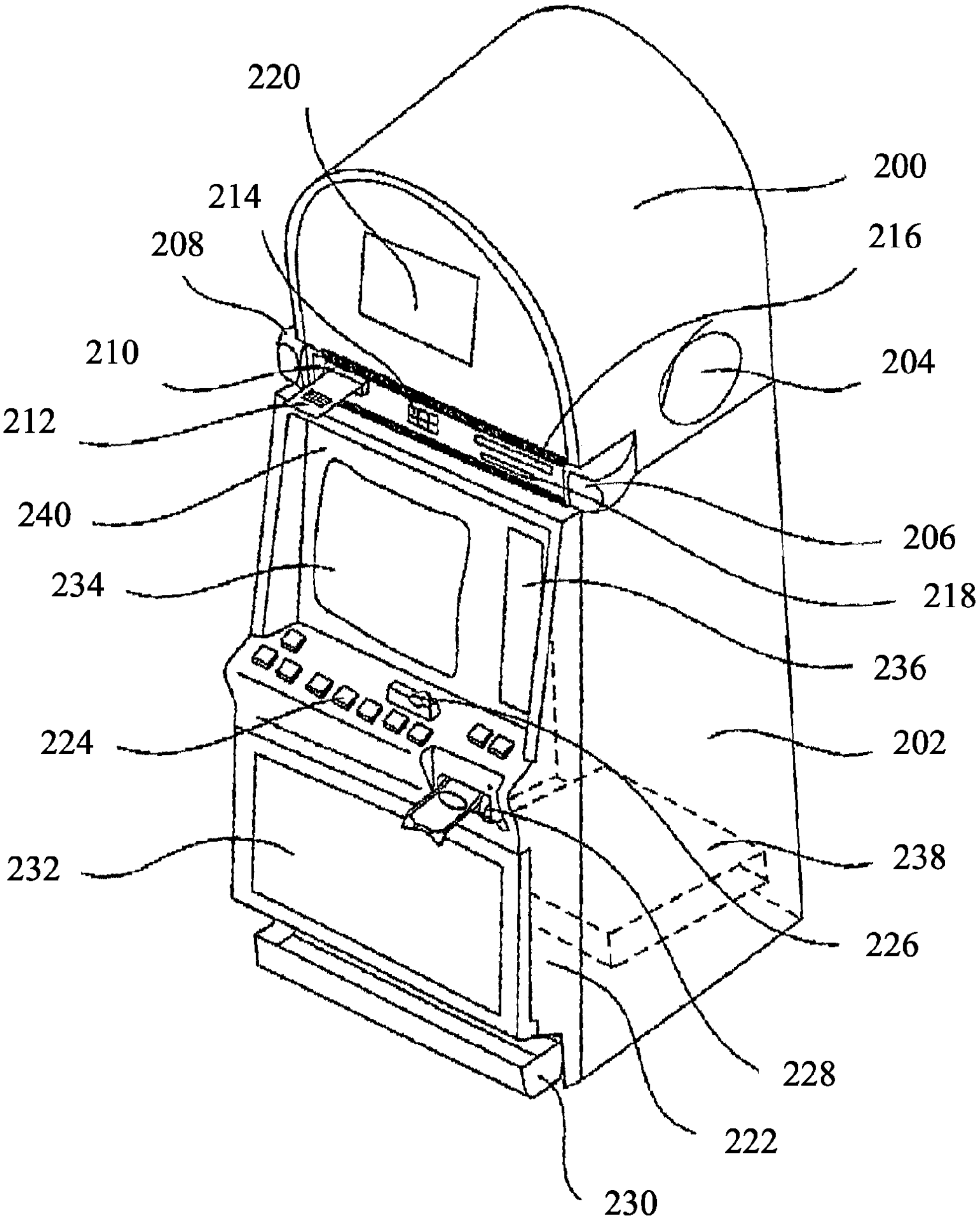
FIG. 2 shows a perspective view of one embodiment of one of the electronic gaming devices shown in FIG. 1.

FIG. 2 shows a perspective view of one embodiment of one of the electronic gaming devices shown in FIG. 1, in this example electronic gaming device 116, otherwise known as a slot machine, slot device, user terminal, player terminal, video slot machine, or other nomenclature. In this embodiment, electronic gaming device 116 comprises a device meeting the standards set by the Regulations of the Nevada Gaming Commission in, for example, "Technical Standards for Gaming Devices and On-Line Slot Systems". Such standards regulate odds, payoff amounts, currency exchange, random number generation, and technical specifications relating to fraud detection and prevention. It may be advantageous to allow live game play via such player terminals because they are manufactured within the aforementioned standards and, thus, retain a degree of similarity between different games and devices. For example, electronic gaming devices manufactured to such standards typically comprise large, lit buttons for players to easily interact with the device.

As illustrated in the example of FIG. 2, electronic gaming device 116 includes a main cabinet 202, which generally surrounds the electronic gaming device interior and is viewable by players. The main cabinet may include a main door 222 on the front of the machine, which opens to provide access to the interior of electronic gaming device 116. Attached to the main door are player-input switches or buttons 224, a coin acceptor 226, and a bill validator 228, a coin tray 230, and a belly glass 232. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, a game denomination (e.g. $0.25 or $1). The bill validator 228, player-input switches 224, video display monitor 34, and information panel are devices used to play a game on the electronic gaming device 116.

According to a specific embodiment, electronic gaming device 116 may be controlled by processor-executable code executed by a processor located on or in master gaming controller 238 housed inside the main cabinet 202 of electronic gaming device 116. The hardware and software associated with the master gaming controller 238 may be distributed throughout the cabinet 202 and is not limited to the specific location illustrated in the FIG. 2.

Many different types of games, including mechanical slot games, video slot games, video poker, video black jack, video pachinko and lottery, may be provided with gaming machines of this invention. In particular, electronic gaming device 116 may be operable to provide a play of many different instances of games of chance and/or skill The instances may be differentiated according to themes, sounds, graphics, type of game (e.g., slot game vs. card game), denomination, number of paylines, maximum jackpot, progressive or non-progressive, bonus games, etc. The electronic gaming device 116 may be operable to allow a player to select a game to play from a plurality of instances available on the gaming machine. For example, the gaming machine may provide a menu with a list of the instances of games that are available for play on electronic gaming device 116 and a player may be able to select from the list a first instance of a game that they wish to play.

The various instances of games available for play on electronic gaming device 116 may be stored as game software on a mass storage device in electronic gaming device 116 or may be generated by, or hosted by, server 134, 136, 138, and/or server 154 and displayed on electronic gaming device 116. The electronic gaming device 116 may executed game software, such as but not limited to video streaming software that allows the game to be displayed on electronic gaming device 116. When game software is stored on electronic gaming device 116, it may be loaded from the mass storage device into an electronic memory, e.g. RAM, for execution by the processor. In some cases, after a selection of a particular game, the game software related to the game may be downloaded from one of the servers 134, 136, 138, and/or server 154, or it may be even downloaded from another player interface.

As illustrated in the example of FIG. 2, electronic gaming device 116 includes a top box 200, which sits on top of the main cabinet 202. The top box 200 houses a number of devices, which may be used to add features to a game being played on electronic gaming device 116, including speakers 204, 206, 208, a ticket printer 210 which prints bar-coded tickets 212, a key pad 214 for entering player tracking information, a florescent display 216 for displaying player tracking information, a card reader 218 for entering a magnetic striped card containing player tracking information, and a video display screen 220. The ticket printer 210 may be used to print tickets for a cashless ticketing system. Further, the top box 200 may house different or additional devices not illustrated in FIG. 2. For example, the top box may include a bonus wheel or a back-lit silk screened panel, which may be used to add bonus features to the game being played on electronic gaming device 116. As another example, the top box may include a display for a progressive jackpot offered on the gaming machine. During a game, these devices are controlled and powered, in part, by circuitry (e.g. a master gaming controller) housed within the main cabinet 202 of the electronic gaming device 116.

In one embodiment, electronic gaming device 116 provides an indication of a status of live-play games. For example, video display screen 220 may display an image indicating which games have an opening for a player to participate and/or a subset of games having an open position. In another embodiment, video display screen 220 may display an image indicating that a new table has opened for game play. For instance, in a networked gaming system comprising gaming device 116 belongs and 100 other electronic gaming devices in communication with server 134, server 134 may, in this example, offer 4 types of games available for live-play: $2/4 Texas Hold 'Em, $3/$6 Texas Hold 'Em, Blackjack with a $25 minimum bet, and Blackjack with a $50 minimum bet. Each of the two Texas Hold 'Em virtual tables may accommodate 10 players, while each of the Blackjack virtual tables may accommodate 7 players playing against a house entity. If all of the available positions for all four virtual tables are "occupied" by players, video display screen 220 may display a message indicating so. However, if one of the players participating in the $3/$6 Hold 'Em virtual table terminates game play, video display screen 220 may display a message, icon, or other visual indication that a "seat" has become available on the $3/$6 virtual Texas Hold 'Em table. Similarly, if one of the players participating in the $50 Blackjack table terminates game play, video display screen may display a message, icon, or other visual indication that a "seat" has become available on the $50 Blackjack table. In any case, information pertaining to available positions on any of the games offered by electronic gaming device 116 and/or server 134 and/or server 154 is generally determined by either server 134 and/or server 154, as the case may be, and provided to electronic gaming device 116 via communication medium 156 and/or communication medium 162.

In another embodiment, an audible indication of live-play status may be provided by one or more speakers 204, 206, and/or 208. For example, if a seat has become available at the $25 Blackjack table described above, speaker 206 may announce, audibly, that a seat has become available at that particular table. In other embodiment, if server 134 forms a new $10/$20 Texas Hold 'Em table, speaker 208 may announce that such a table has just formed, and that 10 players are needed to begin game play. As players join this new table, speakers 204, 206, and/or 208 may update the remaining number of players needed to begin game play. In this embodiment, server 134 generally determines the availability of seats at the various games offered by server 134 and/or server 154 and provides this information to electronic gaming device 116.

In one embodiment, each electronic gaming device provides the live-play status at different times from one another. This avoids a number of electronic gaming devices located near one another from, for example, providing overlapping audible live-play status, potentially creating confusion to potential players or audibly "drowning" one announcement over others. Each electronic gaming device may delay providing live-play status by incorporating a random delay before providing the indication. In another embodiment, server 134 and/or server 154 provides live-play status at predetermined time intervals designed to avoid interference among nearby-situated electronic gaming machines. In this embodiment, server 134 and/or server 156 uses the location information of electronic gaming machines to determine when to send live-play status updates to the electronic gaming machines. For example, server 134 and/or server 156 will generally stagger updates to adjacent electronic gaming machines to avoid audible interference of live-play status. In another embodiment, server 134 and/or server 154 determines a time that each electronic game device should present an indication that a seat has become available, and provides the determined times to each electronic gaming device, respectively. Each electronic gaming device then uses the time provided by server 134 and/or 154 to provide an indication to potential players that a seat has become open, and information relating to the opening, such as a game type, game stakes, etc.

In another embodiment, both a visual indication and an audible indication of live-play game status may be provided by electronic gaming device 116.

It will be appreciated that electronic gaming device 116 is but one example from a wide range of gaming machine designs on which the embodiments discussed herein may be implemented. For example, not all suitable gaming machines have top boxes or player tracking features. Further, some gaming machines have only a single game display—mechanical or video, while others are designed for bar tables and have displays that face upwards. As another example, a game may be generated by, and executed on, a one or more servers 134, 136, 138, and/or server 154 and may be displayed on electronic gaming device 116.

Some player interfaces shown in FIG. 1 are implemented with special features and/or additional circuitry that differentiates them from general-purpose computers (e.g., desktop PC's and laptops). Electronic gaming devices are highly regulated to ensure fairness and, in many cases, electronic gaming devices are operable to dispense monetary awards of multiple millions of dollars. Therefore, to satisfy security and regulatory requirements in a gaming environment, hardware and software architectures may be implemented in electronic gaming devices that differ significantly from those of general-purpose computers.

Figure 3:
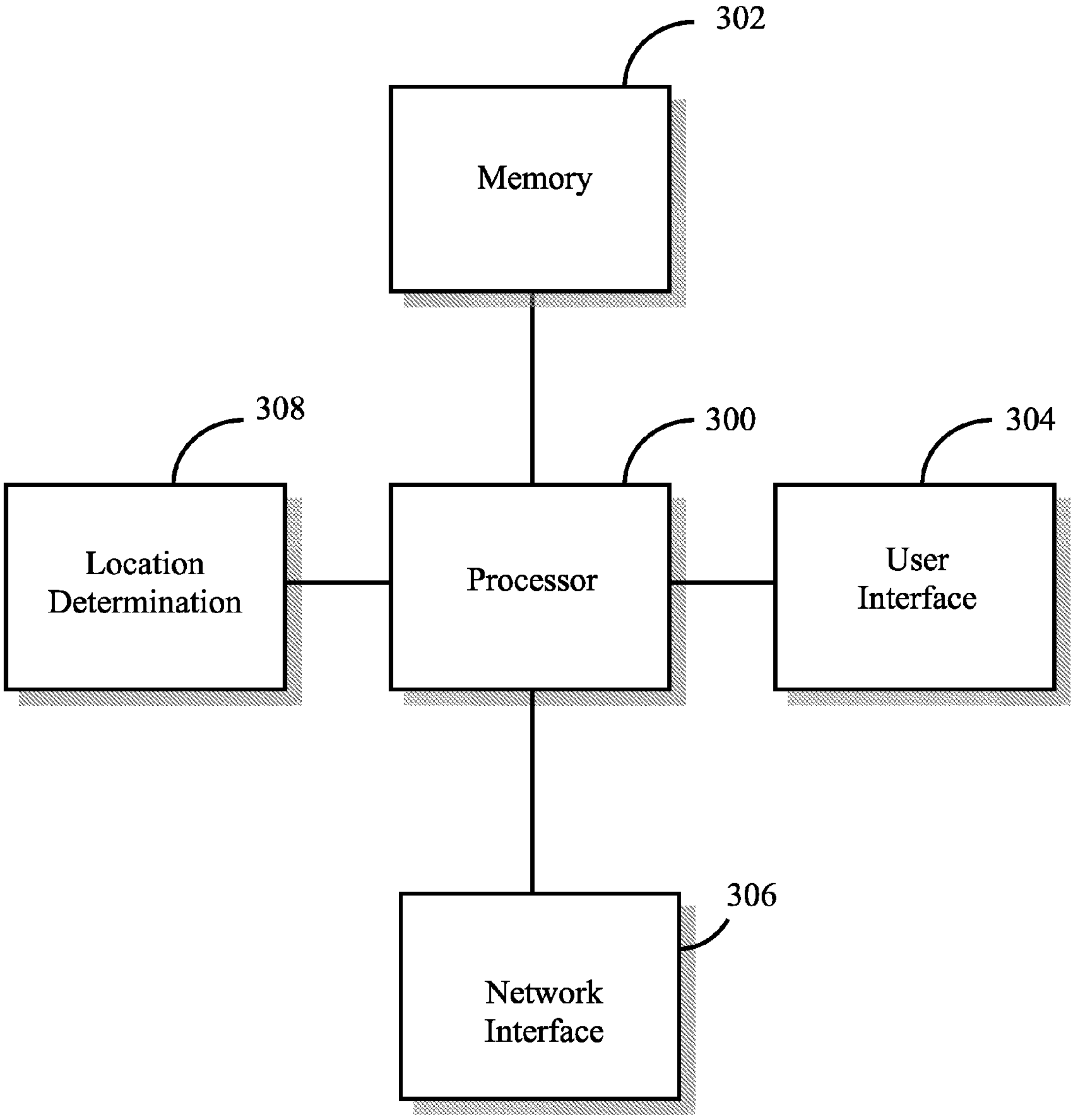
FIG. 3 is a functional block diagram of one embodiment of the electronic gaming device shown in FIG. 2.

FIG. 3 is a functional block diagram of one embodiment of the electronic gaming device shown in FIG. 2, for example, electronic gaming device 116. Shown are processor 300, memory 302, player interface 304, network interface 306, and location device 308. It should be understood that in some embodiments, not all of the functional blocks shown in FIG. 3 are necessary for the proper operation of electronic gaming devices and that some functionality has been omitted for purposes of clarity.

Player interface 304 generally comprises hardware and/or software necessary for allowing a player of electronic gaming device 300 to play games of chance and/or skill either against other players at different electronic gaming devices, against "the house" or non-human player such as electronic gaming device 300, server 134 and/or server 154. Player interface 304, as described above in the description relating to FIG. 2, may comprise a keyboard, keypad, push-buttons, switches, a video display, a touch-screen device, a card reader, a microphone, an image capture device such as a still camera or video camera, a coin and/or bill acceptor, a speaker, a ticket printer, an RS-485 port, an RS-422 port, a fiber optic port, a USB port, a network port, a card reader, and/or virtually any other device that allows a player of the electronic gaming device to communicate, or interact, with the electronic gaming device. A player of electronic gaming device 300 uses player interface 304 to enter player selections and receive information pertaining to a game that the player has selected. Information may include graphic representation of cards, dice, Bingo balls, or other objects of gaming, the status of a game in progress, previous game results, odds for a particular event occurring, a player account balance, a number of "reward points" earned by the player, still or video images of other players, audio from other players or a dealer, and any other information pertaining to game play.

Processor 300 comprises a general-purpose microprocessor well known in the art or it may comprise a custom or semi-custom ASIC able to carry out the functionality required for allowing a player of electronic gaming device 116 to play games. Processor 300 generally executes processor-readable, or processor-executable, instructions stored in one or more mediums, such as memory 302, that control most or all of the functionality of electronic gaming device 116. Examples of memory 302 comprise one or more electronic memories such as RAM, ROM, hard drives, flash memory, EEPROMs, EPROMs, etc. Network interface 306 comprises hardware and/or software configured to send and receive electronic communications between electronic gaming device 116 and other networked devices, such as any of the electronic gaming devices, servers, and/or personal computing devices shown in FIG. 1. Network interface may comprise circuitry necessary to process the electronic communications and may be designed specifically to communicate in a predetermined communication protocol, such as TCP/IP, RS-485 protocols, RS-422 protocols, fiber optic protocols, USB protocols, or other well-known form of digital communication protocols. Each of electronic gaming device, server, and/or personal computing device may be interconnected with each other by one or more communication networks, such as the Internet, a fiber optic network, a radio network, a wired or wireless telephone network, a satellite network, a wired or wireless data network, and/or any other well-known, two-way communication network.

Location device 308 provides information pertaining to the physical location of electronic gaming device 116. It may comprise hardware and/or software necessary to determine a location of electronic gaming device 116. For example, location device 308 may comprise a commercially-available GPS chip plus supporting circuitry. Such a device is well-known in the art and typically provides location accuracy to several meters. Other position-determination devices could be used in the alternative, such as circuitry used to perform multilateration, which uses the difference in distance to two or more fixed stations at known locations that broadcast a reference signal at known times. In another embodiment, the location of electronic gaming device 116 may be determined by human intervention without the need for location device 308. For example, a technician may determine GPS coordinates related to electronic gaming device 116 using a handheld GPS device and enter that information into electronic gaming device 116 via player interface 304, where it would be provided to memory 302 for storage. Processor 300 may then provide the location information to another electronic gaming device or server, either autonomously or upon request by another electronic gaming device or server. In another embodiment, the GPS coordinates determined by the technician could be provided directly to one or more other electronic gaming devices and/or be provided directly to one or more of the servers shown in FIG. 1.

Figure 9:
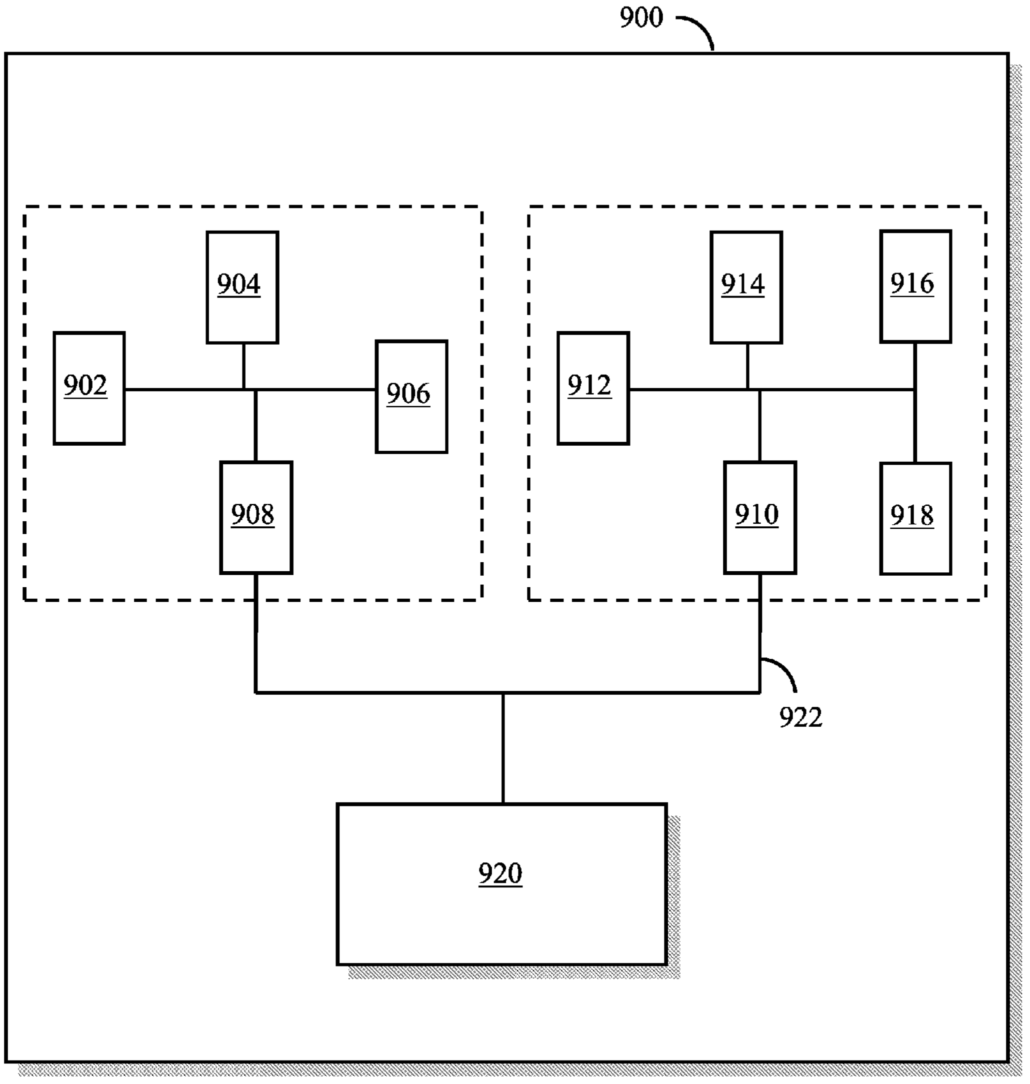
FIG. 9 illustrates one embodiment of a networked gaming system comprising a central server, a first local network, and a second local network.

In yet another embodiment, a pre-assigned identification code or address could be used to determine the location of electronic gaming device 116. For example, as shown in FIG. 9, authorized gaming establishment 900 comprises a central server 920 networked to local servers 908 and 910 via communication medium 922. Electronic gaming devices 902, 904, and 906 are, in turn, networked to server 908, forming a first local network. Each device in the first network comprises an IP address beginning with, in this example, 192.168.1.X. For instance, server 908 could be assigned an IP address of 192.168.1.1, while electronic gaming device 902 could be assigned an IP address of 192.168.1.2 and electronic gaming device 904 assigned an IP address of 192.168.1.3. In addition, each electronic gaming device typically comprises a pre-assigned hardware code, commonly referred to as a MAC address. The MAC address may be associated with the assigned IP address for each of the electronic gaming devices in the first network.

Electronic gaming devices 900, 902, and 904 may be physically located in a first geographic portion of authorized gaming establishment 900, such as "on the third floor", "in the east wing", near the buffet, or other common physical attribute.

Authorized gaming establishment 900 may additionally comprise a second local network, comprising server 910 and electronic gaming devices 912, 914, 916, and 918. Each of these devices in the second network comprises an IP address beginning with, in this example, 192.168.0.X. For instance, server 910 could be assigned an IP address of 192.168.0.1, while electronic gaming device 912 could be assigned an IP address of 192.168.0.2 and electronic gaming device 914 assigned an IP address of 192.168.0.3. In addition, each electronic gaming device typically comprises a pre-assigned hardware code, commonly referred to as a MAC address. The MAC address may be associated with the assigned IP address for each of the electronic gaming devices in the second network. Electronic gaming devices 912, 914, 916, and 918 may be physically located in a second geographic portion of authorized gaming establishment 900, the second geographic portion typically located a predetermined distance away from the first geographic portion to ensure that a player using one of the electronic gaming devices in the first local network cannot view action occurring on an electronic gaming device in the second local network.

Thus, simply by knowing the local IP address and/or MAC address of an electronic gaming device, central server 920 or another server, such as server 154, may determine a "course" location of each of the electronic gaming devices by knowing that each electronic gaming device in the first network is located in the first geographic area of authorized gaming establishment 900, while each electronic gaming device in the second network is located in the second geographic area of authorized gaming establishment 900.

Figure 4:
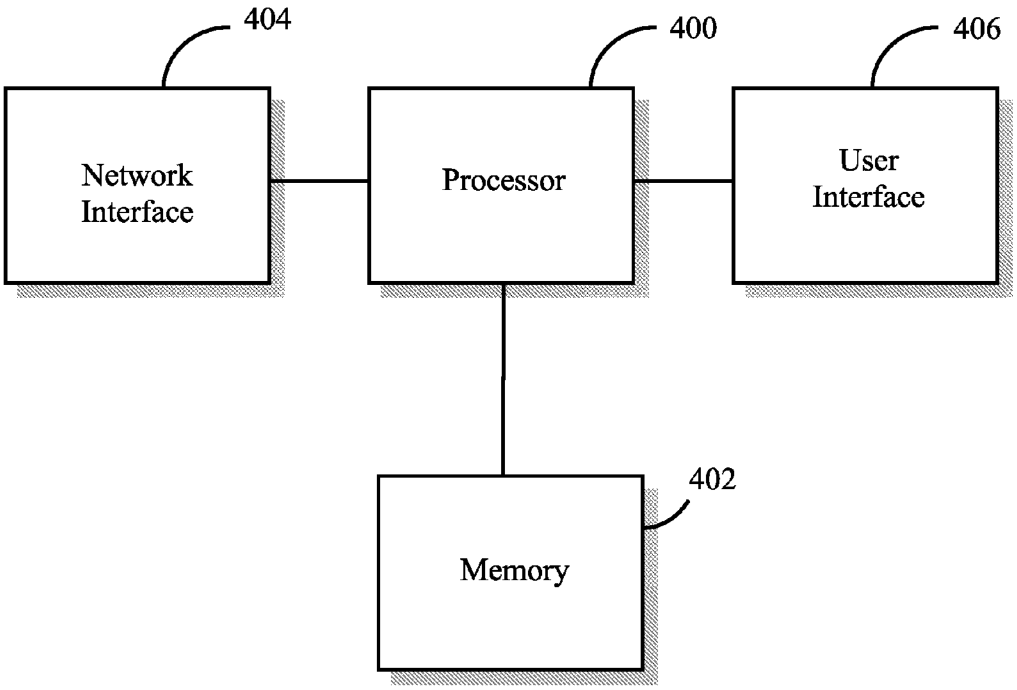
FIG. 4 illustrates a functional block diagram of one embodiment of one of the servers shown in FIG. 1.

FIG. 4 illustrates a functional block diagram of one embodiment of server 134, 136, and/or 138 shown in FIG. 1. These servers each comprise a processor 400, a memory 402, a network interface 404, and a player interface 406. The sever may comprise a computer, application server, web server, or other electronic device that provides functionality for game play between and among players of the electronic gaming devices and/or personal computing devices shown in FIG. 1, including generating a virtual playing environment typically comprising a virtual gaming table, play management, wagering management, etc. For example, the servers may each provide an electronic version of poker, blackjack, craps, roulette, and/or other game of chance and/or skill to remote players using electronic gaming devices operated by the players. The games are typically processed within each server, i.e., random number generation used to provide game values to players (such as card values, dice values, etc.), providing the game values to players, win determination, wager management, etc.

Processor 400 comprises a general-purpose microprocessor well known in the art or it may comprise a custom or semi-custom ASIC able to carry out the functionality required for game play. Processor 400 generally executes processor-executable instructions stored in one or more mediums, such as memory 402, that control most or all of the functionality of the server. Examples of memory 402 include one or more electronic memories such as RAM, ROM, hard drives, flash memory, EEPROMs, EPROMs, etc. Network interface 404 comprises hardware and/or software configured to receive and process electronic communications from electronic gaming devices and personal computing devices connected to one or more communication networks, such as the Internet, a fiber optic network, a radio network, a wired or wireless telephone network, a satellite network, a wired or wireless data network, and/or any other well-known, two-way communication networks.

User interface 406 generally comprises hardware and/or software necessary for allowing a user of the server, such as an authorized technician or operator, to perform various duties related to the maintenance and upkeep of the server. Such duties may include entering information pertinent to the location of various electronic gaming devices distributed within an authorized gaming establishment, updating software, performing trouble-shooting activities, accessing past game-play data, accessing player accounts, and so on. Player interface 406 may comprise a keyboard, keypad, push-buttons, switches, a video display, a touch-screen device, a card reader, a microphone, an image capture device such as a still camera or video camera, a coin and/or bill acceptor, a speaker, a ticket printer, an RS-485 port, an RS-422 port, a fiber optic port, a USB port, a card reader, a network port, and/or virtually any other device that allows a player of the server to communicate with the server.

Figure 5:
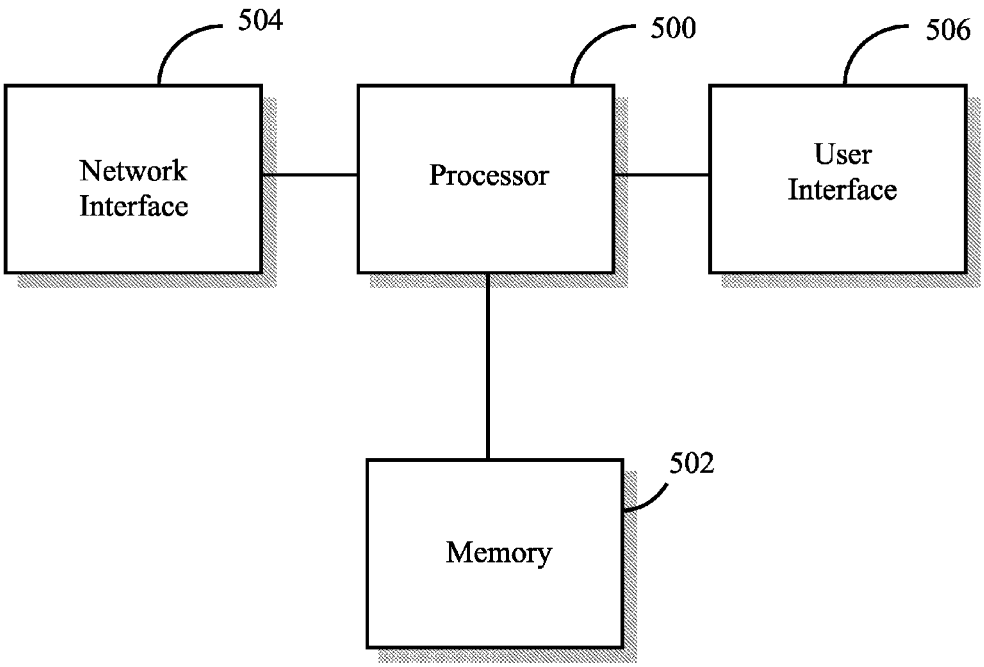
FIG. 5 illustrates a functional block diagram of one embodiment of server 154 shown in FIG. 1.

FIG. 5 illustrates a functional block diagram of one embodiment of the server 154 shown in FIG. 1. Server 154 allows players located in different authorized gaming establishments to play games of chance and/or skill against and/or with one another and/or against a house entity in real-time or near real-time, each using a respective one of the electronic gaming devices shown in FIG. 1.

Server 154 comprises a processor 500, a memory 502, a network interface 504, and a player interface 506. Server 154 may comprise a computer, application server, web server, or other electronic computing device that provides functionality for game play between and among players of the electronic gaming devices and/or personal computing devices shown in FIG. 1, including generating a virtual playing environment typically comprising a virtual gaming table, play management, wagering management, etc. Processor 500 comprises a general-purpose microprocessor well known in the art or it may comprise a custom or semi-custom ASIC able to carry out the functionality required for game play. Processor 500 generally executes processor-executable instructions stored in one or more mediums, such as memory 502, that control most or all of the functionality of server 154. Examples of memory 502 include one or more electronic memories such as RAM, ROM, hard drives, flash memory, EEPROMs, EPROMs, etc. Network interface 504 comprises hardware and/or software configured to receive and process electronic communications from electronic gaming devices and personal computing devices connected to one or more communication networks, such as the Internet, a fiber optic network, a radio network, a wired or wireless telephone network, a satellite network, a wired or wireless data network, and/or any other well-known, two-way communication networks.

User interface 506 generally comprises hardware and/or software necessary for allowing a user of server 154, such as an authorized technician or operator, to perform various duties related to the maintenance and upkeep of server 154. Such duties may include entering information pertinent to the location of various electronic gaming devices distributed within an authorized gaming establishment, updating software, performing trouble-shooting activities, accessing past game-play data, accessing player accounts, and so on. User interface 506 may comprise a keyboard, keypad, push-buttons, switches, a video display, a touch-screen device, a card reader, a microphone, an image capture device such as a still camera or video camera, a coin and/or bill acceptor, a speaker, a ticket printer, an RS-485 port, an RS-422 port, a fiber optic port, a USB port, a card reader, a network port, and/or virtually any other device that allows a player of server 154 to communicate with server 154.

Figure 6:
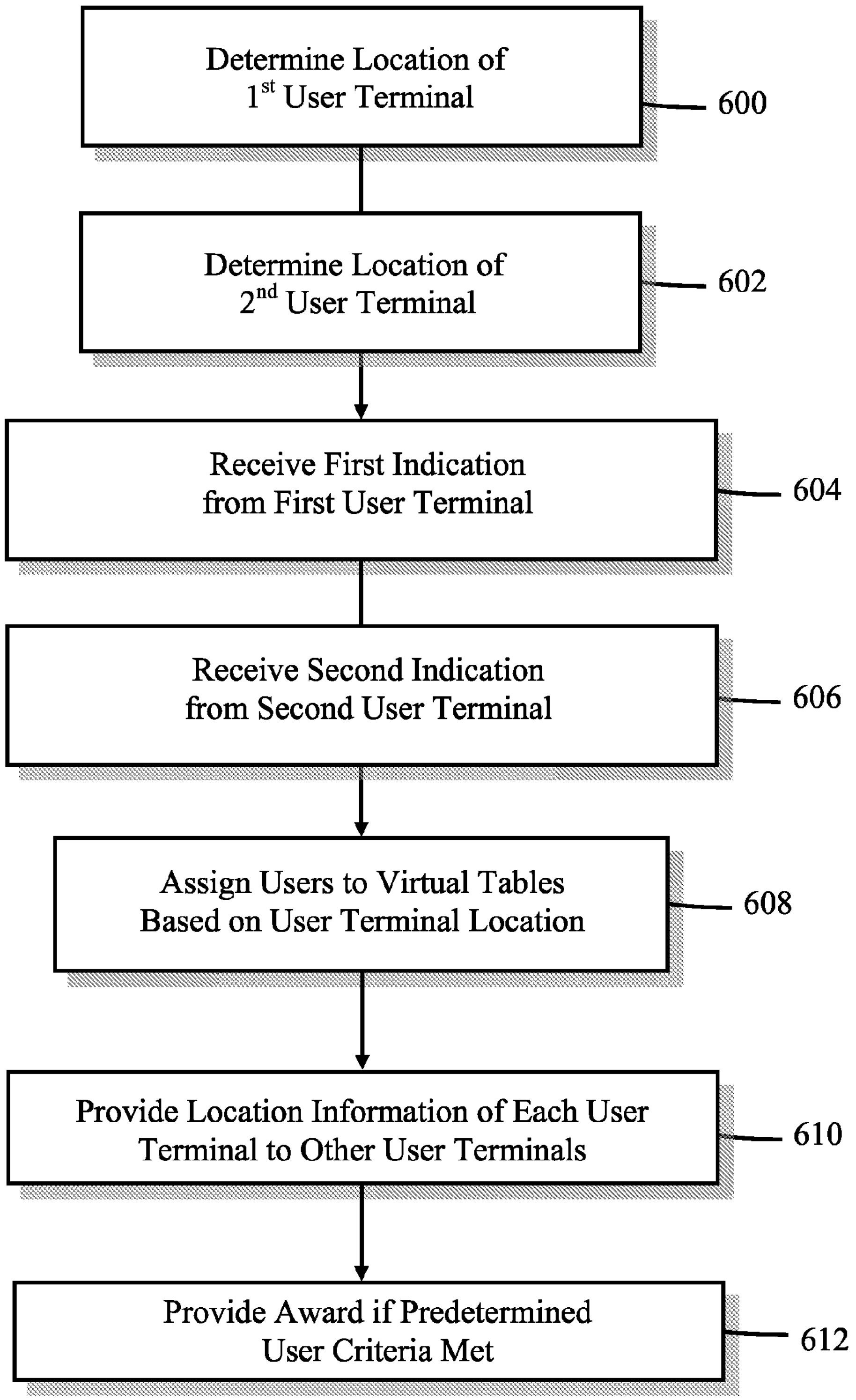
FIG. 6 is a flow diagram illustrating one embodiment of a method for providing network-based gaming within an authorized gaming establishment.

FIG. 6 is a flow diagram illustrating one embodiment of a method for providing live-play network-based gaming within an authorized gaming establishment. The method is implemented by a processor, such as processor 400 shown in FIG. 4, located in server 134, 136, and/or 138, executing processor-readable instructions stored in a memory, such as memory 402 shown in FIG. 4. The server is electronically coupled to a plurality of electronic gaming devices, such as the ones shown in FIG. 1. It should be understood that in some embodiments, not all of the steps shown in FIG. 6 are performed and that the order in which the steps are carried out may be different in other embodiments. It should be further understood that some minor method steps have been omitted for purposes of clarity.

At block 600, the server determines a location of a first electronic gaming device. The determination may be performed once, for example during an initialization of the server, and/or it may be performed at other times, such as at periodic time intervals or upon the occurrence of a predefined event, such as receipt of an indication from a player of the first electronic gaming device of a desire to play a particular game offered by the server.

The location may be expressed as a GPS coordinate, a description of the location (for example, 1st floor, 2nd floor, 3rd floor, near 1st elevator bank, near $5 slot machines, near exit #12, near front entrance, near rear entrance, 3rd position in a "bank" of 6 electronic gaming devices, gaming area 4, etc.), X/Y mapping coordinates, polar coordinates, or virtually any other expression of a location. In one embodiment, the location of the first electronic gaming device may be determined by a position-determining device located within the first electronic gaming device, such as a GPS device. In another embodiment, the location of the first electronic gaming device may be determined by a portable GPS device carried by a technician employed by the authorized gaming establishment. In this embodiment, the technician may approach the first electronic gaming device and determine its position by observing an indication displayed by the technician's GPS device. The technician may then provide this information to the server by any number of ways, including electronically uploading the information to the server or entering the information using user interface 406, as described above. In another embodiment, a location of the first electronic gaming device may be provided to the server based on other information, such as a schematic diagram or blueprint of a layout of the authorized gaming establishment.

In many cases, the location of the first electronic gaming device in an authorized gaming establishment is determined manually, i.e., by measuring the distance of each electronic gaming device to certain stationary objects, such as walls, doorways, windows, etc. This information is typically entered into a software program used to simulate the physical layout of an authorized gaming establishment. Such software may be used, for example, in conjunction with a video monitoring system, jackpot payout alert, security system, player's reward card system, and/or other system where electronic gaming device layout and/or location may be useful. As such, the location information of the first electronic gaming device may be provided to the server electronically from the software program that stores the location information.

In other embodiments, the location of the first electronic gaming device is determined using an IP address or MAC address, previously described herein.

At block 602, the server may determine a location of a second electronic gaming device in any one or more of the ways described above with respect to determining the location of the first electronic gaming device. The server may determine the location of other electronic gaming devices distributed within the authorized gaming establishment as well.

At block 604, the server receives an indication from the first electronic gaming device that a player of the first electronic gaming device wishes to participate in a game offered by the server. The indication is typically an electrical signal in analog or digital format, sent by the first electronic gaming device in response to a first player of the first electronic gaming device interacting with the first electronic gaming device.

For example, the first player may sit in front of the first electronic gaming device and press a button or touch a touchscreen associated with a player interface, such as player interface 304. The act of pressing the button or touchscreen is associated with initiating participation in a game offered by the first electronic gaming device, the server, or both. In one embodiment, the first player may press a button or the touchscreen associated with a game selection, such as jacks-or-better poker, Texas Hold 'Em, stud poker, roulette, bingo, keno, craps, or other games of chance and/or skill In response to the first player pressing the selected button or touchscreen position, a processor within the first electronic gaming device, such as processor 300 of FIG. 3, generates an indication of the first player's desire to initiate game play of the particular selected game type. The indication may comprise an analog or digital electronic signal sent wirelessly or via electrically-conductive wire(s), or it may comprise a signal compatible with some other communication medium, such as fiber-optic cable, or any other medium.

In another embodiment, the indication described above may additionally comprise a further selection by the first player to further define his or her game selection. For example, the first player may use the player interface to select a game of Texas Hold 'Em, then select a particular set of betting limits, or stakes, related to a game of Texas Hold 'Em. For example, the first player may be provided a choice of betting limits of $1/$2, $3/$6, $5/$10, and $10/$20 betting limits, the first dollar amount in each pair representing a minimum and maximum bet per player turn during the first two rounds of play and the second dollar amount in each pair representing a minimum and maximum bet per player turn during the final two rounds of play. Other possible further selections by the first player, in addition to the stakes discussed above, comprise a maximum number of players at a virtual table, a minimum number of players at a virtual table, a location of other players, an identification of another player that is familiar to the first player, such as a friend or relative, and/or other selections.

At block 606, the server receives an indication from the second electronic gaming device that a player of the second electronic gaming device wishes to participate in the same game and/or other criteria as was selected by the first player at block 604. For example, if the first player selected a game of draw poker having stakes of $5 initial wagering and $10 for other rounds of wagering, the player operating the second electronic gaming device also selects draw poker having stakes of $5 initial wagering and $10 for other rounds of wagering.

At block 608, after receiving the first and second indications from the first and second electronic gaming devices, respectively, the server assigns the first player and the second player to either the same virtual game table or to different virtual tables associated with the selected game and/or other criteria, based on the relative locations of the electronic gaming devices. The technical details of assigning players to virtual tables by servers is well known in the art.

In one embodiment, the first player and the second player are assigned to different tables if the first electronic gaming device is within a predetermined distance from the second electronic gaming device. This is to prevent collusion between the first player and the second player. If electronic gaming devices are located too close to one another, the first player and/or the second player could shuttle between terminals to view each other's virtual cards and gain an advantage over other players. In one embodiment, the predetermined distance is a minimum distance to ensure that one player cannot shuttle between another electronic gaming device playing at the same virtual table within a given time limit for each player to act as his or her turn comes due during game play.

For example, if the first electronic gaming device and the second electronic gaming device were both located on the second floor of a casino, spaced apart from one another by only 10 feet, a player of the first electronic gaming device could walk over to the second electronic gaming device and view the virtual cards assigned to the player of the second electronic gaming device, either with or without the knowledge and/or consent of the second player. Then, the first player could return to the first electronic gaming device and use the knowledge of the second player's virtual cards to gain an advantage over other players at the same virtual table. However, if the first and second electronic gaming devices were separated from one another by, for example, 100 feet, it would be difficult for the first player to go over to the second electronic gaming device, view the second player's virtual cards, and return to the first electronic gaming device in time to avoid a time-out associated with a maximum time period in which to act during game play. Thus, a predetermined distance may be selected on the basis of the distance between electronic gaming devices, determined from each electronic gaming device location, as determined in blocks 600 and 602.

In another example, a factor other than the distance between electronic gaming devices may be used to determine whether the first and second players may be assigned to the same virtual table. For example, if the first electronic gaming device is located on one floor of a multi-story casino and the second electronic gaming device is located on a different floor than the first electronic gaming device, the server may use this information as the basis for assigning two players to the same virtual table or not. For example, if the first and second electronic gaming devices are located on the same floor, then the server may not assign players of the first and second terminals, respectively, to the same virtual table. However, if the first and second electronic gaming devices are, in fact, located on different floors, the server may assign players of the first and second terminals, respectively, to the same virtual table.

In another embodiment, server 154 may use the IP address and/or MAC address of electronic gaming devices to determine whether to assign players to the same virtual table. For example, server 154 may assign two players to the same virtual table only if their respective electronic gaming devices comprise IP addresses belonging to different sub-networks.

In other embodiments, a combination of location criteria may be used to determine whether the first and second players may be assigned to the same virtual table. For example, if the first electronic gaming device is located on a first floor of a casino and the second electronic gaming device is located on a second floor of the same casino, but both electronic gaming devices are near the same staircase, both the distance and the floor location of the first and second electronic gaming devices may be used to determine player table assignment. Thus, the server may not assign the first player and the second player to the same virtual table, even though they on different floors, if the distance between the first and second electronic gaming devices is within a predetermined distance. Said another way, the server may only assign the first and second players to the same virtual table if they are a) located on different floors and b) spaced apart from one another by a predetermined distance one would have to travel to get from the first electronic gaming device to the second electronic gaming device. Of course, other combinations of criteria could be used in the alternative.

At block 610, after players have been assigned to a virtual game table, the server may reveal the location of each player playing at the assigned virtual game table to the other players at the same table. This may be accomplished by transmitting visual information, such as a map and/or textual information, regarding the location of each electronic gaming device to each of the players at the virtual game table.

At block 612, play begins, and the slot club card server begins tracking player activities related to game play. If a predetermined criterion is met, such as a number of hands played, a number of jackpots or tournaments won, a number of all-in bets made, a number of losing hands played, a number of losing hands in a row, and/or other criteria, an award may be given to any player who meets the criterion. Game play continues typically until the end of a round of play, where one or more winners are determined and wagers are settled in accordance with principles well-known in the art.

Figure 7:
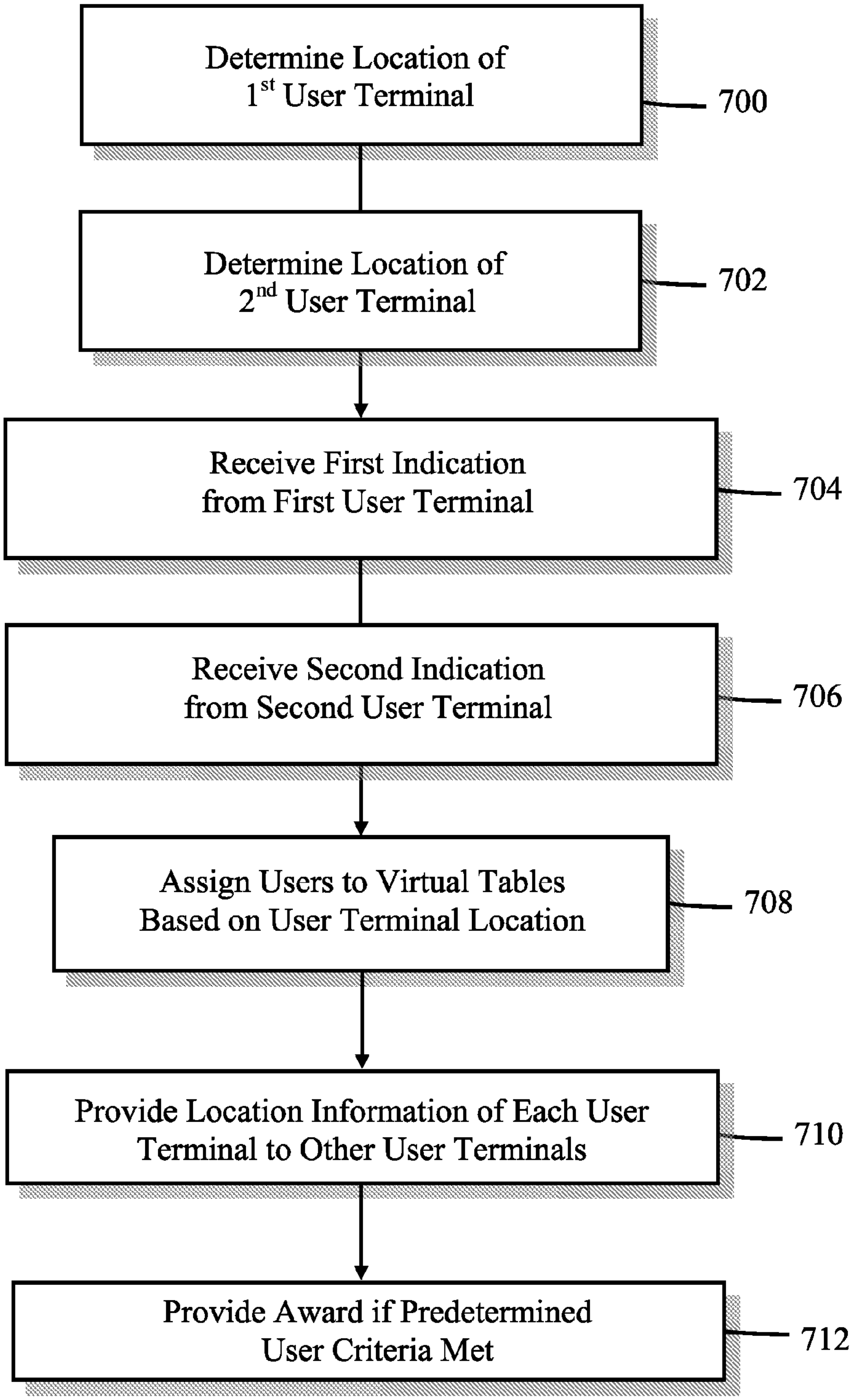
FIG. 7 is a flow diagram illustrating one embodiment of a method for providing network-based gaming between/among players located at two or more authorized gaming establishments.

FIG. 7 is a flow diagram illustrating one embodiment of a method for providing live-play, network-based gaming between/among players located at two or more authorized gaming establishments, such as two or more players operating respective electronic gaming devices located in different casinos. The method is implemented by a processor, such as processor 500 shown in FIG. 5, located in server 154, as shown in FIG. 1, executing processor-readable instructions stored in a memory, such as memory 502 shown in FIG. 5. The server is typically electronically coupled to a plurality of electronic gaming devices distributed between/among two or more authorized gaming establishments, such as the ones shown in FIG. 1 located in, in this embodiment, authorized gaming establishments 106, 108, and 110. Server 154 may be located in any one of the authorized gaming establishments, or it could be placed at some other location, such as a third party management company, web hosting company, etc.

In one embodiment, server 154 is electronically coupled to electronic gaming devices via intermediate servers, such as servers 134, 136, and/or 138. In another embodiment, server 154 is electronically coupled directly to the electronic gaming devices. In yet another embodiment, some electronic gaming devices are electronically coupled directly to server 154, while other electronic gaming devices are routed through an intermediate server.

It should be understood that in some embodiments, not all of the steps shown in FIG. 7 are performed and that the order in which the steps are carried out may be different in other embodiments. It should be further understood that some minor method steps have been omitted for purposes of clarity.

At block 700, server 154 determines a location of a first electronic gaming device. The determination may be performed once, for example during an initialization of server 154, and/or it may be performed at other times, such as at periodic time intervals or upon the occurrence of a predefined event, such as receipt of an indication from a player of the first electronic gaming device of a desire to play a particular game offered by server 154.

The location may be expressed as a GPS coordinate of the first electronic gaming device, a location and/or description of the authorized gaming establishment, (for example, an authorized gaming establishment name, address, telephone number, web address, GPS coordinates, etc.), and/or a more detailed location of the first electronic gaming device inside the authorized gaming establishment, such as a floor where the first electronic gaming device is located (for example, 1$^{st}$ floor, 2$^{nd}$ floor, near 1$^{st}$ elevator bank, near $5 slot machines, near exit #12, near front entrance, near rear entrance, 3$^{rd}$ position in a "bank" of 6 electronic gaming devices, gaming area 4, etc.), X/Y mapping coordinates, polar coordinates, or virtually any other expression of a location. For example, the location of the first electronic gaming device may be expressed as: inside the MGM Grand Casino in Las Vegas, Nev., on the second floor, 35 feet from the nearest staircase and 15 feet from the nearest elevator. Or, the location may be expressed as simply: inside Caesar's Palace.

In one embodiment, the location of the first electronic gaming device may be determined by a position-determining device located within the first electronic gaming device, such as a GPS device. In another embodiment, the location of the first electronic gaming device may be determined by a portable GPS device carried by a technician employed by one or more of the authorized gaming establishments and/or a third party management company. In this embodiment, the technician may approach the first electronic gaming device and determine its position by observing an indication displayed by the technician's GPS device. The technician may then provide this information to server 154 by any number of ways, including electronically uploading the information to server 154 or entering the information using user interface 506, as described above. In another embodiment, a location of the first electronic gaming device may be provided to server 154 based on other information, such as a schematic diagram or blueprint of a layout of any of the authorized gaming establishments. In many cases, the location of each electronic gaming device in any authorized gaming establishment is determined manually, i.e., by measuring the distance of each electronic gaming device to certain stationary objects, such as walls, doorways, windows, etc. This information is typically entered into a software program used to simulate the physical layout of an authorized gaming establishment. Such software may be used, for example, in conjunction with a video monitoring system, jackpot payout alert, security system, player's reward card system, and/or other system where electronic gaming device layout and/or location may be useful. As such, the location information of the first electronic gaming device may be provided to server 154 electronically from the software program that stores the location information.

In other embodiments, the location of the first electronic gaming device is determined using an IP address or MAC address, previously described herein.

At block 702, the server determines a location of a second electronic gaming device in any one or more of the ways described above with respect to determining the location of the first electronic gaming device. The server may determine the location of other electronic gaming devices distributed in other authorized gaming establishments as well.

At block 704, server 154 receives an indication from the first electronic gaming device that a player of the first electronic gaming device wishes to participate in a game offered by the server. The indication is typically an electrical signal in analog or digital format, sent by the first electronic gaming device in response to a first player of the first electronic gaming device interacting with the first electronic gaming device.

For example, the first player may sit in front of the first electronic gaming device and press a button or touch a touchscreen associated with a player interface, such as player interface 304. The act of pressing the button or touchscreen is associated with initiating participation in a game offered by the first electronic gaming device, the server, or both. In one embodiment, the first player may press a button or the touchscreen associated with a game selection, such as jacks-or-better poker, Texas Hold 'Em, stud poker, roulette, bingo, keno, craps, or other games of chance and/or skill In response to the first player pressing the selected button or touchscreen position, a processor within the first electronic gaming device, such as processor 300 of FIG. 3, generates an indication of the first player's desire to initiate game play of the particular selected game type. The indication may comprise an analog or digital electronic signal sent wirelessly or via electrically-conductive wire(s), or it may comprise a signal compatible with some other communication medium, such as fiber-optic cable, or any other medium.

In another embodiment, the indication described above may additionally comprise a further selection by the first player to further define his or her game selection. For example, the first player may use the player interface to select a game of Texas Hold 'Em, then select a particular set of betting limits, or stakes, related to a game of Texas Hold 'Em. For example, the first player may be provided a choice of betting limits of $1/$2, $3/$6, $5/$10, and $10/$20 betting limits, the first dollar amount in each pair representing a minimum and maximum bet per player turn during the first two rounds of play and the second dollar amount in each pair representing a minimum and maximum bet per player turn during the final two rounds of play. Other possible further selections by the first player, in addition to the stakes discussed above, comprise a maximum number of players at a virtual table, a minimum number of players at a virtual table, a location of other players, an identification of another player that is familiar to the first player, such as a friend or relative, and/or other selections.

At block 706, server 154 receives an indication from the second electronic gaming device that a player of the second electronic gaming device wishes to participate in the same game and/or other criteria as was selected by the first player at block 704. For example, if the first player selected a game of draw poker having stakes of $5 initial wagering and $10 for other rounds of wagering, the player operating the second electronic gaming device also selects draw poker having stakes of $5 initial wagering and $10 for other rounds of wagering.

At block 708, after receiving the first and second indications from the first and second electronic gaming devices, respectively, server 154 assigns the first player and the second player to either the same virtual game table or to different virtual tables associated with the selected game and/or other criteria. The technical details of assigning players to virtual tables by servers is well known in the art.

In one embodiment, the first player and the second player are assigned to different virtual tables if the first electronic gaming device is within a predetermined distance from the second electronic gaming device. This is to prevent collusion between the first player and the second player. If electronic gaming devices are located too close to one another, the first player and the second player could shuttle between terminals to view each other's virtual cards and gain an advantage over other players. In one embodiment, the predetermined distance is a minimum distance to ensure that one player cannot shuttle between another electronic gaming device playing at the same virtual table within a given time limit for each player to act as his or her turn comes due during game play.

For example, if the first electronic gaming device and the second electronic gaming device were both located on the second floor of authorized gaming establishment 110, spaced apart from one another by only 10 feet, a player of the first electronic gaming device could walk over to the second electronic gaming device and view the virtual cards assigned to the player of the second electronic gaming device, either with or without the knowledge and/or consent of the second player. Then, the first player could return to the first electronic gaming device and use the knowledge of the second player's virtual cards to gain an advantage over other players at the same virtual table. However, if the first and second electronic gaming devices were separated from one another by, for example, 100 feet, it would be difficult for the first player to go over to the second electronic gaming device, view the second player's virtual cards, and return to the first electronic gaming device in time to avoid a time-out associated with a maximum time period in which to act during game play. Thus, a predetermined distance may be selected on the basis of the distance between electronic gaming devices, determined from each electronic gaming device location, as determined in blocks 500 and 502.

In another example, a factor other than the distance between electronic gaming devices may be used to determine whether the first and second players may be assigned to the same virtual table. For example, if the first electronic gaming device is located on one floor of a multi-story authorized gaming establishment and the second electronic gaming device is located on a different floor than the first electronic gaming device, server 154 may use this information as the basis for assigning two players to the same virtual table or not. For example, if the first and second electronic gaming devices are located on the same floor, then server 154 may not assign players of the first and second terminals, respectively, to the same virtual table. However, if the first and second electronic gaming devices are, in fact, located on different floors, the server may assign players of the first and second terminals, respectively, to the same virtual table.

Another factor related to distance to be considered by server 154 when assigning players to virtual tables is whether or not electronic gaming devices are located within the same authorized gaming establishment. For example, if the first electronic gaming device is located within a first authorized gaming establishment and the second electronic gaming device is located within a second authorized gaming establishment, then server 154 may consider the two electronic gaming devices to be located greater than a predetermined distance whereby collusion would be difficult and/or impossible. Thus, merely identifying the authorized gaming establishment where electronic gaming devices are located may be enough location information to assign players to virtual tables. In one embodiment, no two players may be assigned to the same virtual table if they are playing electronic gaming devices located within the same authorized gaming establishment.

In another embodiment, server 154 may use the IP address and/or MAC address of electronic gaming devices to determine whether to assign players to the same virtual table. For example, server 154 may assign two players to the same virtual table only if their respective electronic gaming devices comprise IP addresses belonging to different sub-networks.

In other embodiments, a combination of location criteria may be used to determine whether the first and second players may be assigned to the same virtual table. For example, if the first electronic gaming device is located on a first floor of a casino and the second electronic gaming device is located on a second floor of the same casino, but both electronic gaming devices are near the same staircase, both the distance and the floor location of the first and second electronic gaming devices may be used to determine player table assignment. Thus, server 154 may not assign the first player and the second player to the same virtual table, even though they on different floors, if the distance between the first and second electronic gaming devices is within a predetermined distance. Said another way, server 154 may only assign the first and second players to the same virtual table if they are a) located on different floors and b) spaced apart from one another by a predetermined distance one would have to travel to get from the first electronic gaming device to the second electronic gaming device. Of course, other combinations of criteria could be used in the alternative.

At block 710, after players have been assigned to a virtual game table, the server may provide the location of each player playing at the assigned virtual game table to the other players at the same table. This may be accomplished by transmitting visual information, such as a map and/or textual information, to each of the players at the virtual game table.

At block 712, play begins, and the slot club card server begins tracking player activities related to game play. If a predetermined criterion is met, such as a number of hands played, a number of jackpots or tournaments won, a number of all-in bets made, a number of losing hands played, a number of losing hands in a row, and/or other criteria, an award may be given to any player who meets the criterion. Game play continues typically until the end of a round of play, where one or more winners are determined and wagers are settled in accordance with principles well-known in the art.

Figure 8:
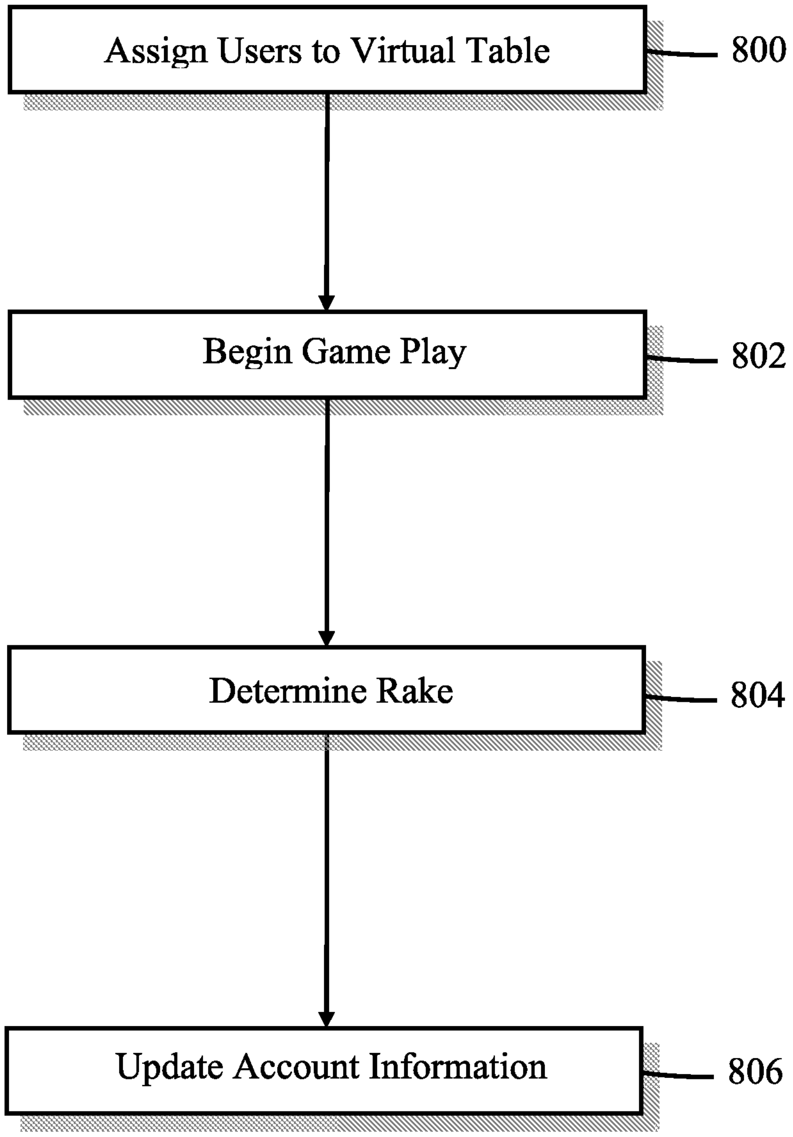
FIG. 8 is a flow diagram illustrating one embodiment of a method for providing network-based gaming between/among players located at two or more authorized gaming establishments.

FIG. 8 is a flow diagram illustrating one embodiment of a method for providing live-play, network-based gaming between/among players located at two or more authorized gaming establishments. The method is implemented by a processor, such as processor 500 shown in FIG. 5, located in server 154, as shown in FIG. 1, executing processor-readable instructions stored in a memory, such as memory 502 shown in FIG. 5. The server is typically electronically coupled to a plurality of electronic gaming devices distributed between/among two or more authorized gaming establishments, such as the ones shown in FIG. 1 located in, in this embodiment, authorized gaming establishments 106, 108, and 110. Server 154 may be located in any one of the authorized gaming establishments, or it could be placed at some other location, such as a third party management company.

In one embodiment, server 154 is electronically coupled to electronic gaming devices via intermediate servers, such as servers 134, 136, and/or 138. In another embodiment, server 154 is electronically coupled directly to the electronic gaming devices. In yet another embodiment, some electronic gaming devices are electronically coupled directly to server 154, while other electronic gaming devices are routed through an intermediate server.

It should be understood that in some embodiments, not all of the steps shown in

FIG. 8 are performed and that the order in which the steps are carried out may be different in other embodiments. It should be further understood that some minor method steps have been omitted for purposes of clarity.

At block 800, server 154 assigns two or more players to a virtual table to play a game against one another, a house entity, or a combination of both, as described by the method shown in FIG. 7. For example, a first player playing on electronic gaming device 124 and a second player playing on electronic gaming device 118 could be assigned by server 154 to a first virtual poker table able to accommodate up to 10 players. For purposes of this example, it will be assumed that only the first and second players are assigned to the first virtual table.

At block 802, game play begins, typically by either the first or second player, or both, placing a wager known as an ante into the "pot", or proceeds from each round of game play. The ante serves as a minimum amount a player may win in one or more rounds of game play, for example, if there are no bets placed by any player during game play.

At block 804, processor 500 may determine a "rake", or "house cut", or a scaled amount commission fee that is paid to the "house" or authorized gaming establishment for each round of game play. In one embodiment, the rake is determined at a single point during game play, such as during a final betting round near the end of a round of game play. In other embodiments, the rake is determined at the end of each round of wagering during game play, or it may be determined at other points of time during game play.

Typically, the rake is determined as a percentage of the pot at one or more points of time during a round of game play. In a game of poker, the rake may range from 5% -10% of the pot at the conclusion of a round of game play, typically limited to a predetermined amount. In other embodiments, a percentage is not used to calculate the rake, but other methods may be used, such as using a fixed amount for each round of play, using the number of players at each virtual table, using a predetermined time period to take a predetermined amount, and/or using the number of players involved in a final round of betting, to name but a few examples.

Normally, the rake is paid to a house entity that is hosting the game. However, at block 804, the rake is divided between/among two or more authorized gaming establishments, a third party management company, and/or some other party. In one embodiment, the rake is divided in proportion to a number of players playing the game from each particular authorized gaming establishment. For example, if a virtual card table comprises two players operating two electronic gaming devices, respectively, located at a first authorized gaming establishment, three players operating three electronic gaming devices, respectively, from a second authorized gaming establishment, and three players operating three electronic gaming devices, respectively, from a third authorized gaming establishment, then processor 500 executes processor-readable instructions stored in memory 202 that causes server 154 to divide the rake by the total number of players currently active in game play on the virtual game table (in this case 8), and multiply this number by the number of players currently active on the virtual table at each authorized gaming establishment (in this case, the first authorized gaming establishment receives 2/8 or one-quarter of the rake, second authorized gaming establishment receives 3/8 or three-eighths of the rake, and third authorized gaming establishment also receives 3/8 or three-eighths of the rake). In another embodiment, a third party management company providing server 154 to the authorized gaming establishments may receive a portion of the rake as well, either as a set amount per round of play, a percentage of the pot, an amount based on time played, number of tables played, and/or other criteria.

In another embodiment, the rake is split between/among at least two or more authorized gaming establishments based on a predetermined contractual arrangement between/among the authorized gaming establishments. The split may be based on any one or more factors, such as the expected number of players over the course of a predetermined time period, the size of each authorized gaming establishment, the location of each authorized gaming establishment, etc.

The following is a description of one embodiment of how the rake is split between/among at least two or more authorized gaming establishments. The amount of the Rake is a fixed percentage of the amount in the Pot (rake percent) up to a maximum amount per pot (MaxRake). The Pot and the Rake may be displayed on each electronic gaming device. The amount in the Pot and the Rake may be updated after each round of betting is completed. Each player is associated with the casino where his or her electronic gaming terminal is located. The Rake is divided among participating casinos in proportion to the amount bet by the associated player as follows:

For a game with, "n" players, let the amounts bet by each player be

B1, B2, . . . Bi, . . . Bn. Then the total amount bet is $$TB=B1+B2+\ldots+Bi+\ldots+Bn.$$

The Total Rake (TR) is the lesser of MaxRake and Rake Percent times TB.

The amount of the Rake paid to the ith Casino is $$Ri=TR\times Bi/TB \text{ where } i \text{ is a number from 1 to } n.$$

The amount in the Pot is TB−TR.

Example: In a six player game, players 1 through 6 have bet $30, $24, $38, $9, $15, and $36 respectively. The Rake Percent is 5% and the Rake Maximum is $5. Then the total amount bet is:

$$TB=\$30+\$24+\$38+\$9+\$15+\$36=\$152$$

The Rake Percent times TB=5%×$152=$7.60 and the Rake Maximum is $5.00 so the Total Rake is TR=lesser of $7.60 and $5.00=$5.00

The Rake is divided among the six casinos as follows:

$$R1=\$5.00\times\$30/\$152=\$0.986842$$

$$R2=\$5.00\times\$24/\$152=\$0.789474$$

$$R3=\$5.00\times\$38/\$152=\$1.25$$

$$R4=\$5.00\times\$9/\$152=\$0.296053$$

$$R5=\$5.00\times\$15/\$152=\$0.493420$$

$$R6=\$5.00\times\$36/\$152=\$1.184211$$

The amount of the pot is TB−TR=$152.00−$5.00=$147.00

At block 806, typically after a round of play has been completed and the rake determined for each authorized gaming establishment and/or others, server 154 may update an account related to each of the authorized gaming establishments and/or other parties. For example, processor 500 may update a first record stored in memory 500, representing an account balance of the first authorized gaming establishment, a second record stored in memory 500, representing an account balance of the second authorized gaming establishment, and a third record stored in memory 500, representing an account balance of the third authorized gaming establishment to reflect an increased account balance in accordance with each entity's portion of the rake.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an electronic gaming device. In the alternative, the processor and the storage medium may reside as discrete components.

Accordingly, an embodiment of the invention may comprise a non-transitory processor-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. An apparatus for providing live-play, network-based gaming, comprising:

a memory device configured to store processor-executable instructions;

a processor configured to execute the processor-executable instructions that, when executed by the processor, cause the apparatus to:

provide a game to a first player on a first video display screen of a first electronic gaming device located at a first authorized gaming establishment and to a second player on a second video display screen of a second electronic gaming device located at a second gaming establishment, the game comprising a live game of chance and/or skill having multiple rounds of wagering played between the first and second players or between the first and second players and a house entity;

determine that an indication should be provided to the first and second electronic gaming devices that a player position has become available upon determining whether a player position has become available for one or more other games different from the game;

determine a first timing that the first electronic gaming device should present the indication on a third video display screen of the first electronic gaming device, the third video display screen being different than the first video display screen;

determine a second timing that the second electronic gaming device should present the indication on a fourth video display screen, the fourth video display screen being different than the second video display screen and the second timing being different than the first timing; and provide the first timing and the second timing to the first and second electronic gaming devices, respectively, so as to enable the first and second electronic gaming devices to present the indication at different times; and a network interface configured to electronically couple the apparatus to the first electronic gaming device, the second electronic gaming device, and to other electronic gaming devices that are located within the first or second authorized gaming establishments.

2. The apparatus of claim 1, wherein the processor-executable instructions further comprise instructions causing the apparatus to:

calculate a first scaled commission for the first authorized gaming establishment and a second scaled commission for the second authorized gaming establishment, the first scaled commission based at least on a total dollar amount that was wagered by the first player during at least one round of the multiple rounds of the game.

3. The apparatus of claim 2, wherein the processor-executable instructions further comprise instructions causing the apparatus to:

calculate the first scaled commission for each round of the multiple rounds of the game.

4. The apparatus of claim 2, wherein the processor-executable instructions further comprise instructions causing the apparatus to:

calculate the first scaled commission based on a number of electronic gaming devices located within the first authorized gaming establishment that play the game.

5. The apparatus of claim 2, wherein the processor-executable instructions further comprise instructions causing the apparatus to:

calculate the first scaled commission based on a number of electronic gaming devices located within the first authorized gaming establishment that play the game relative to a total number of electronic gaming devices that play the game.

6. A method for providing live-play network-based gaming to a plurality of electronic gaming devices, comprising:

providing, via a server, a game to a first player on a first video display screen of a first electronic gaming device located at a first authorized gaming establishment and to a second player on a second video display screen of a second electronic gaming device located at a second authorized gaming establishment, the game comprising a live game of chance and/or skill having multiple rounds of wagering played between the first and second players or between the first and second players and a house entity;

determining, via the server, that an indication should be provided to the first and second electronic gaming devices that a player position has become available upon determining whether a player position has become available for one or more games different from the game;

determining, via the server, a first timing that the first electronic gaming device should present the indication on a third video display screen of the first electronic gaming device, the third video display screen being different than the first video display screen;

determining, via the server, a second timing that the second electronic gaming device should present the indication on a fourth video display screen, the fourth video display screen being different than the second video display screen and the second timing being different than the first timing;

providing, via the server, the first timing and the second timing to the first and second electronic gaming devices, respectively, so as to enable the first and second electronic gaming devices to present the indication at different times; and connecting the server to a communication medium for electronically coupling the server to the first electronic gaming device, the second electronic gaming device, and to other electronic gaming devices that are located within the first and second authorized gaming establishments.

7. The method of claim 6, wherein the server further:

determines a first scaled commission for the first authorized gaming establishment and a second scaled commission for the second authorized gaming establishment, the first scaled commission based at least on a total dollar amount that was wagered by the first player during at least one round of the multiple rounds of the game.

8. The method of claim 7, wherein the first scaled commission is calculated for each round of the multiple rounds of the game by the server.

9. The method of claim 7, further comprising:

determining the first scaled commission based on a number of electronic gaming devices located within the first authorized gaming establishment that are playing the game.

10. The method of claim 7, further comprising:

determining the first scaled commission based on a number of electronic gaming devices located within the first authorized gaming establishment that are playing the game relative to a total number of electronic gaming devices playing the game.

* * * * *